(12) United States Patent
Madaiah

(10) Patent No.: US 9,036,519 B2
(45) Date of Patent: May 19, 2015

(54) LTE WIRELESS COMMUNICATION METHOD FOR TRANSCEIVING WIRELESS DEVICE DATA

(71) Applicant: TEJAS NETWORKS LIMITED, Bangalore, Karnataka (IN)

(72) Inventor: Vinod Kumar Madaiah, Karnataka (IN)

(73) Assignee: Tejas Networks Limited (IN)

( * ) Notice: Subject to any disclaimer, the term of this patent is extended or adjusted under 35 U.S.C. 154(b) by 209 days.

(21) Appl. No.: 13/684,305

(22) Filed: Nov. 23, 2012

(65) Prior Publication Data
US 2013/0136040 A1 May 30, 2013

(51) Int. Cl.
| H04B 7/00 | (2006.01) |
| H04W 4/00 | (2009.01) |
| H04W 72/04 | (2009.01) |
| H04B 7/26 | (2006.01) |
| H04W 92/20 | (2009.01) |

(52) U.S. Cl.
CPC .......... *H04W 72/0406* (2013.01); *H04W 92/20* (2013.01); *H04B 7/2643* (2013.01)

(58) Field of Classification Search
None
See application file for complete search history.

(56) References Cited

U.S. PATENT DOCUMENTS

| 2013/0077473 A1* | 3/2013 | Ojha et al. ............... 370/221 |
| 2013/0136040 A1* | 5/2013 | Madaiah .................. 370/280 |
| 2013/0155844 A1* | 6/2013 | Madaiah .................. 370/221 |

* cited by examiner

*Primary Examiner* — Kwang B Yao
*Assistant Examiner* — Adam Duda
(74) *Attorney, Agent, or Firm* — Merchant & Gould P.C.

(57) ABSTRACT

The present invention relates to an LTE wireless communication method for transceiving wireless device data. In one embodiment, this is accomplished by a plurality of base transceiver station (BTS) linked by a network over which the base transceiver stations communicate, wherein the network includes at least one leaf BTS and at least two hub BTS, and wherein hub BTS include a first hub BTS and a second hub BTS, checking periodically for control signal by all the BTS, wherein the control signals are periodically exchanged by all the BTS through wireless channel, transparently, down-linking user traffic towards a user equipment append to the leaf BTS from the first hub BTS to the leaf BTS in the first communication area using a first frequency band and up-linking the user traffic from the user equipment append to the leaf BTS using wireless channel between second hub BTS and leaf BTS.

19 Claims, 7 Drawing Sheets

LTE WIRELESS COMMUNICATION METHOD FOR TRANSCEIVING WIRELESS DEVICE DATA

This application claims benefit of Serial No. 44048/CHE/2011, filed 24 Nov. 2011 in India and which application is incorporated herein by reference. To the extent appropriate, a claim of priority is made to the above disclosed application.

FIELD OF THE INVENTION

The present invention relates to wireless communication. More particularly, relates to a Long Term Evolution (LTE) method and system.

BACKGROUND OF THE INVENTION

Wireless communications is the transfer of information between two or more points over a wireless channel (i.e. which are not physically connected). At present, known mechanisms for communicating over wireless channel includes Time-division duplexing (TDD), Frequency-division duplexing (FDD) and a combination of TDD and FDD (i.e. Half-duplex FDD).

Many wireless systems employ either a time division duplex (TDD) time division multiple access (TDMA) or a frequency diversity duplex (FDD) frequency division multiple access (FDMA) allocation scheme. TDD shares a single radio frequency (RF) channel e.g. F 1 between the base and subscriber, allocating time slices between the downlink (transmission from the base to the subscriber) and the uplink (transmission from the subscriber to the base). FDD employs two frequencies e.g. F 1 and F 2, each dedicated to either the downlink or the uplink and separated by a duplex spacing. Two different frequencies may be used over single antenna, one frequency for transmission and another frequency for reception. Single antenna transceiver is possible by using duplexer—a type of filter that splits frequency-before the Radio Frequency (RF) antenna. Duplexers lead to power wastage as duplexer has attenuation, that is, adds significant noise at reception and reduces transmission signal power while transmitting.

For wireless access systems which provide Internet access in addition to or in lieu of voice communications, data and other Web based applications dominate the traffic load and connections within the system. Data access is inherently asymmetric, exhibiting typical downlink-to-uplink ratios of between 4:1 and 14:1.

TDD systems, in which the guard point (the time at which changeover from the downlink to the uplink occurs) within a frame may be shifted to alter the bandwidth allocation between the downlink and the uplink, have inherent advantages for data asymmetry and efficient use of spectrum in providing broadband wireless access. TDD systems exhibit 40% to 90% greater spectral efficiency for asymmetric data communications than FDD systems, and also support shifting of power and modulation complexity from the subscriber unit to the base to lower subscriber equipment costs. Further, in TDD there is wastage of time slots called guard gap which is used to cycle the transceiver from transmitting mode to receiving mode and vice-versa. Current TDD implementation does not allow sending of one-way traffic (e.g. uplink traffic) to another node over wireless network and then over X2 interface.

There is, therefore, a need in the art for a method and system which will be efficient without the wastage of time slots and power for an efficient communication in a wireless channel of a LTE network.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one aspect of the present invention is an LTE wireless communication method for transceiving wireless device data, the method comprising: a plurality of base transceiver station (BTS) linked by a network over which the base transceiver stations communicate, wherein the network includes at least one leaf BTS and at least two hub BTS, and wherein hub BTS include a first hub BTS and a second hub BTS, checking periodically for control signal by all the BTS, wherein the control signals are periodically exchanged by all the BTS through wireless channel, transparently, down-linking user traffic towards a user equipment append to the leaf BTS from the first hub BTS to the leaf BTS in the first communication area using a first frequency band and up-linking the user traffic from the user equipment append to the leaf BTS using wireless channel between second hub BTS and leaf BTS.

In another aspect of the present invention is an eNodeB or a relay node or a BTS, comprising: a memory, a processor communicatively coupled to the memory and a control circuit communicatively coupled to the memory and the processor, wherein the control circuit is configured to perform: communicating with a plurality of base transceivers station (BTS) linked by a network over which the base transceiver stations communicate, wherein the network includes at least one leaf BTS and at least two hub BTS, and wherein hub BTS include a first hub BTS and a second hub BTS, checking periodically for control signal by all the BTS, wherein the control signals are periodically exchanged by all the BTS through wireless channel, transparently, down-linking user traffic towards a user equipment append to the leaf BTS from the first hub BTS to the leaf BTS in the first communication area using a first frequency band and up-linking the user traffic from the user equipment append to the leaf BTS using wireless channel between second hub BTS and leaf BTS.

In yet another aspect of the present invention provides an LTE wireless communication method for transceiving wireless device data, the method comprising: a plurality of base transceiver station (BTS) linked by a network over which the base transceiver stations communicate, wherein the network includes at least one leaf BTS and at least two hub BTS, and wherein hub BTS include a first hub BTS and a second hub BTS, checking periodically for control signal by all the BTS, wherein the control signals are periodically exchanged by all the BTS through wireless channel, transparently, down-linking user traffic towards a user equipment append to the leaf BTS from the second hub BTS to the leaf BTS in the second communication area using a second frequency band and up-linking the user traffic from the user equipment append to the leaf BTS using wireless channel between first hub BTS and leaf BTS.

In yet another aspect of the present invention provides an eNode B or a relay node or a BTS, comprising: a memory, a processor communicatively coupled to the memory and a control circuit communicatively coupled to the memory and the processor, wherein the control circuit is configured for transceiving wireless device data to perform: communicating with a plurality of base transceiver station (BTS) linked by a network over which the base transceiver stations communicate, wherein the network includes at least one leaf BTS and at least two hub BTS, and wherein hub BTS include a first hub BTS and a second hub BTS, checking periodically for control signal by all the BTS, wherein the control signals are periodically exchanged by all the BTS through wireless channel, transparently, down-linking user traffic towards a user equipment append to the leaf BTS from the second hub BTS to the leaf BTS in the second communication area using a second frequency band and up-linking the user traffic from the user equipment append to the leaf BTS using wireless channel between first hub BTS and leaf BTS.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the detailed description of the invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

Figure 1:
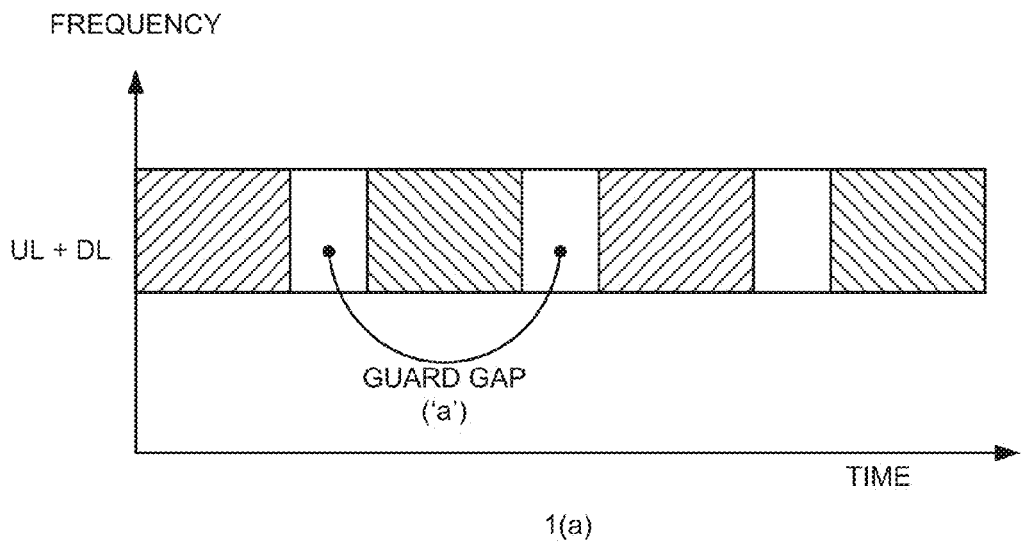
FIGS. 1A-1B shows timing diagrams of bandwidth allocation in FDD and TDD.
Figure 1:
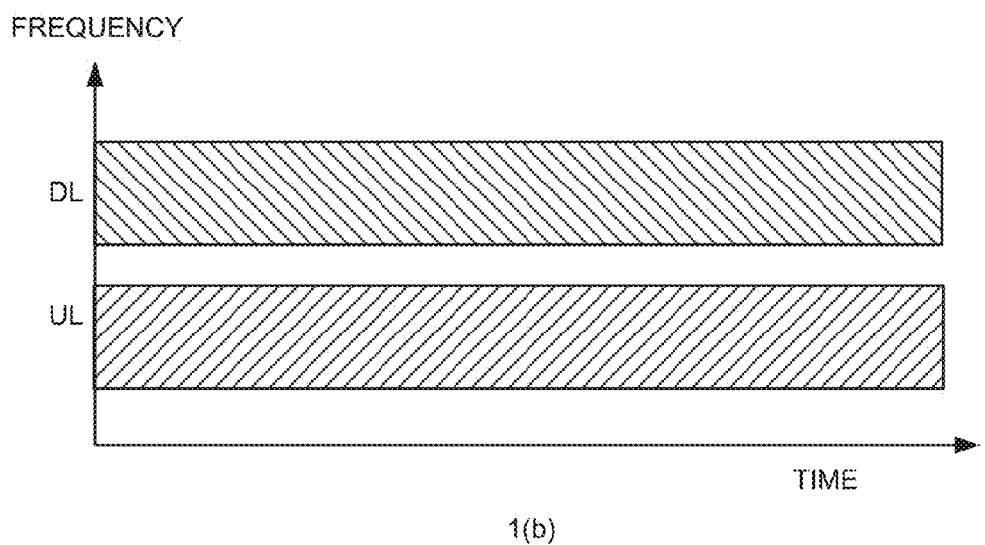

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

FIGS. 1A-1B shows timing diagrams of bandwidth allocation in FDD and TDD. FIG. 1A-1B is a timing diagram showing typical TDD timing, FDD timing and bit counts for transmit (TX) and receive (RX) communication. As shown in FIG. 1A, the TDD system transmits (TX) for about 1 ms, then has a gap period "a", then receives (RX) for about 1 ms. This pattern repeats about every 2 ms, and is known as a frame. The TDD scheme shown may be used by a wireless telephone, wireless radio or other wireless communications device utilizing TDD mode of operation.

As shown in FIG. 1B, for FDD operation, both the TX and RX radio control signals are active for the entire frame. In this case, the signals are active for twice the period than in TDD mode operation.

Figure 2:
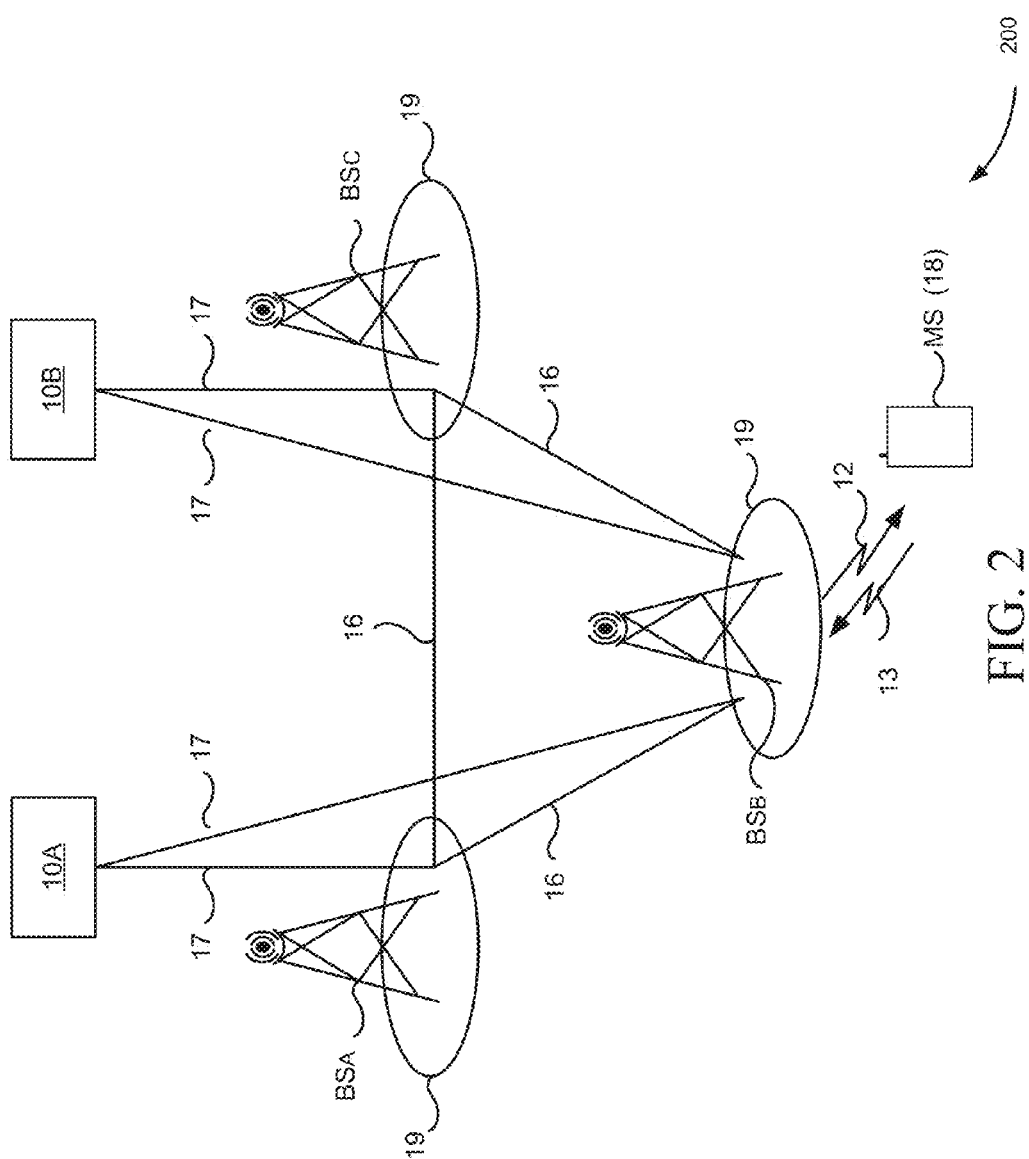
FIG. 2 shows communication network architecture according to the present invention.

A communication system, such as a Long Term Evolution (LTE) system is shown in FIG. 2, including a Radio Access Network (RAN), comprising at least one Radio Base Station (RBS) (or eNode B) BSa, BSb and BSc. The eNode Bs are connected over an interface such as the S1-interface 17 to at least one server gateway and mobility management entity node (S-GW/MME) 10a and 10b. The 5-GW/MME node handles control signaling for instance for mobility, and is connected to external networks (not shown in FIG. 2) such as the Public Switched Telephone Network (PSTN) or the Integrated Services Digital Network (ISDN), and/or a connectionless external network as the Internet.

The RAN provides communication and control for a plurality of user equipments (MS) 18 (only one shown in FIG. 2) and each RBS BSa-BSc is serving at least one cell 19 through and in which the MSs 18 are moving. The RBSs BSa-BSc are communicating with each other over a communication interface 16, such as X2. The MSs each uses downlink (DL) channels 12 and uplink (UL) channels 13 to communicate with at least one RBS over a radio or air interface.

According to a preferred embodiment of the present invention, the communication system is herein described as an LTE system. The skilled person, however, realizes that the inventive method and arrangement work very well on other communications systems as well. User equipments are herein referred to as mobile stations such as mobile telephones ("cellular" telephones) and laptops with mobile termination and thus can be, for example, portable, pocket, hand-held, computer-included or car-mounted mobile devices which communicate voice and/or data with the RAN.

Figure 3:
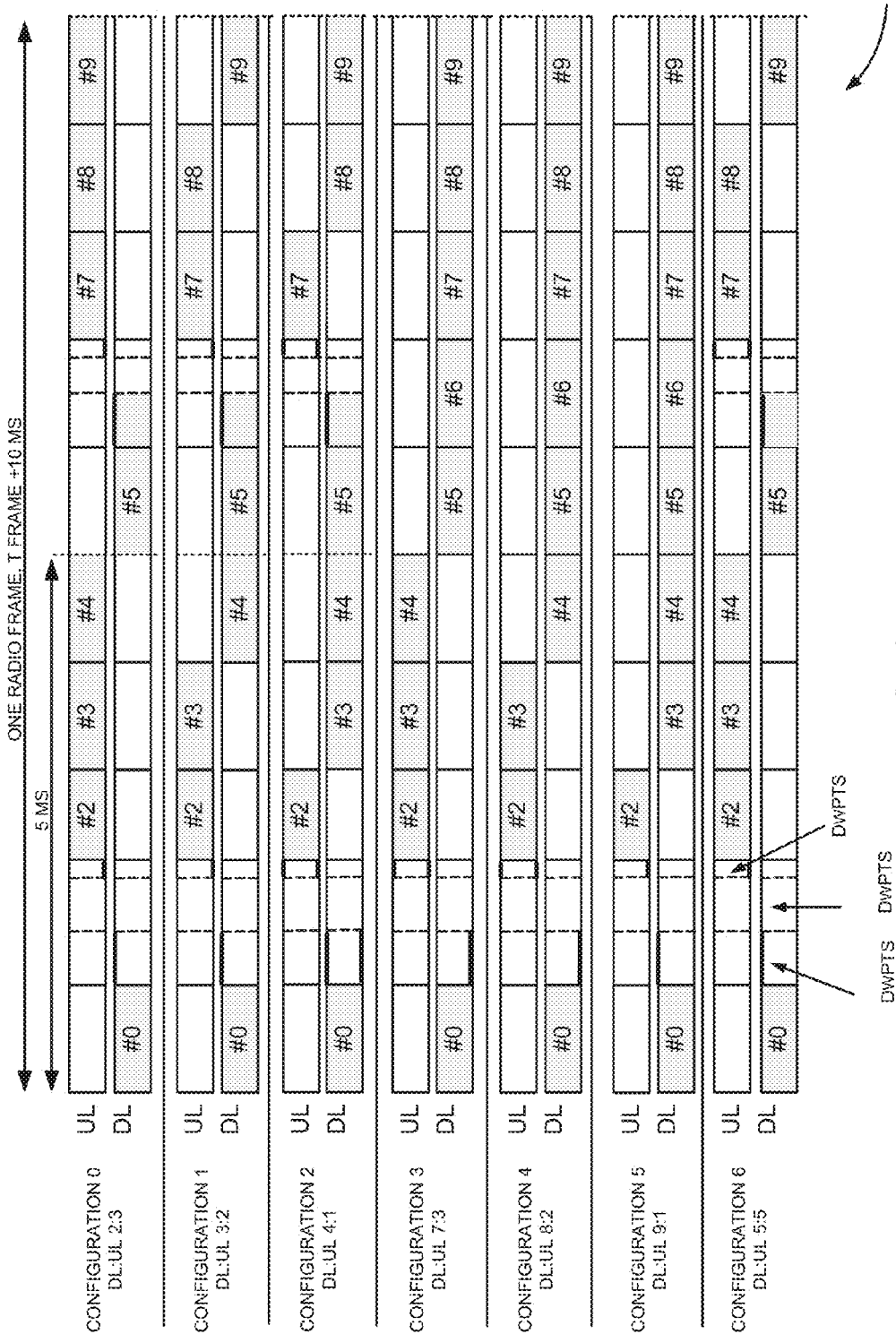
FIG. 3 illustrates various possible downlink/uplink configuration of Time Division Duplex (TDD).

FIG. 3 illustrates various possible downlink/uplink configuration of Time Division Duplex (TDD). In the case of TDD operation, there is a single carrier frequency only and uplink and downlink transmissions are separated in the time domain on a cell basis. As seen in the figure, some sub-frames are allocated for uplink transmissions and some sub-frames for downlink transmission, with the switch between downlink and uplink occurring in the special sub-frame (sub-frame 1 and, in some cases, sub-frame 6 as shown in FIG. 1). Different asymmetries in terms of the amount of resources—that is, sub-frames—allocated for uplink and downlink transmission respectively are provided through the seven different downlink/uplink configurations illustrated (as shown in figure). As seen in the figure, sub-frames 0 and 5 are always allocated for downlink transmission while sub-frame 2 is always allocated for uplink transmissions. The remaining sub-frames (except the special sub-frame; see below) can then be flexibly allocated for downlink or uplink transmission depending on the configured downlink/uplink configuration. To avoid severe interference between downlink and uplink transmissions in different cells, neighboring cells typically have the same downlink/uplink configuration. This makes it difficult to change the downlink/uplink configuration dynamically, for example on a frame-by-frame basis. Each configuration (7 configurations) is fixed during the setup time; one cannot change the configuration once the network is up and running. It can be changed by stopping the BTS and changing the configuration mode.

Therefore, the current LTE specification assumes that the downlink/uplink configuration is relatively static. It can be changed on a very slow basis though, in order to adapt to changing traffic patterns. It could also, in principle, be different in different areas, for example to match different traffic patterns, although inter-cell interference needs to be carefully addressed in this case.

As the same carrier frequency is used for uplink and downlink transmission, both the base station and the terminal need to switch from transmission to reception and vice versa. The switch between downlink and uplink occurs in the special sub-frame, which is split into three parts: a downlink part (DwPTS), a guard period (GP), and an uplink part (UpPTS). The DwPTS is in essence treated as a normal downlink sub-frame, 7 although the amount of data that can be transmitted is smaller due to the reduced length of the DwPTS compared to a normal sub-frame. The UpPTS, however, is not used for data transmission due to the very short duration. Instead, it can be used for channel sounding or random access. It can also be left empty, in which case it serves as extra guard period.

An essential aspect of any TDD system is the possibility to provide a sufficiently large guard period (or guard time), where neither downlink nor uplink transmissions occur. This guard period is necessary for switching from downlink to uplink transmission and vice versa and, as already mentioned, it is clear that a sufficient amount of configurability of the guard period is needed to meet different deployment scenarios.

Figure 4:
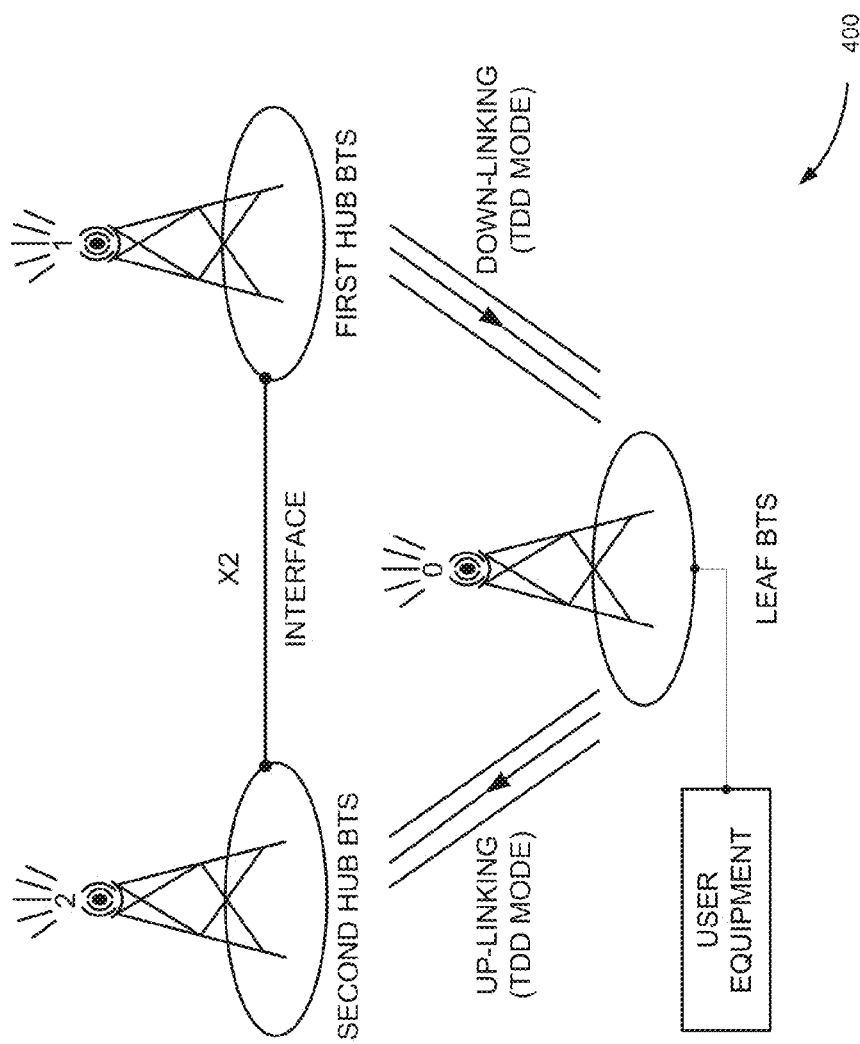
FIG. 4 depicts an example of an LTE wireless communication system for transceiving wireless device data according to one embodiment of the present invention.

FIG. 4 depicts an example of an LTE wireless communication system for transceiving wireless device data according to one embodiment of the present invention. The system includes one or more Radio Base Station (RBS) (or eNode B or a radio node or a radio frequency node or a wireless node) i.e. a leaf node, a first node and a second node. All the nodes are communicating with each other over a communication interface, such as X2. During the active communication (during the traffic flow) between the two nodes, the other nodes keep exchanging the control signals with the two nodes and the same is fed back to them to know the channel condition. User Equipment uses downlink (DL) channels and uplink (UL) channels to communicate with leaf node over a radio or air interface. The leaf node provides communication and control for a plurality of user equipments (UE) (only one shown in FIG. 4) and each other node is serving at least one cell through and in which the UE are moving. According to a preferred embodiment of the present invention, the communication system is herein described as an LTE system. The skilled person, however, realizes that the inventive method and arrangement work very well on other communications systems as well. User equipments are herein referred to as mobile stations such as mobile telephones ("cellular" telephones) and laptops with mobile termination and thus can be, for example, portable, pocket, hand-held, computer-included or car-mounted mobile devices which communicate voice and/or data with the Radio Access Network (RAN).

In an example operation, one or more base transceiver station (BTS) or nodes linked by a network over which the base transceiver stations communicate, where the network includes one leaf BTS and at least two hub BTS. The hub BTS may be further categorized into a first hub BTS and a second hub BTS. All the BTS exchange control signals periodically through wireless channel, transparently. For downloading a user traffic (from UE) attached to the leaf BTS from the first hub BTS to the leaf BTS, the downloading happens in a first communication area using a first frequency band (i.e. one frequency of the wireless channel)

For uploading a user traffic (from UE) attached to the leaf BTS, the leaf BTS uses wireless channel between second hub BTS and leaf BTS (may be using the same frequency for uploading) either by piggybacking or tunneling via second hub BTS. The downloading bearer path from first hub BTS to leaf BTS and the uploading bearer path from the leaf BTS to second hub BTS is a reverse path non-congruent bearer (hence forth called as non-congruent reverse path bearers) in an access communication network (access communication network includes BTSs, UEs and wireless channel).

Also, the uploading and downloading mechanism over the wireless channel is achieved by Time Division Duplex (TDD) Mode, where the ratio of uploading and downloading user data rate and throughput data rate is n:0 or 0:n, where n=1, 2, 3, 4 . . . n. (where throughput is total bits transmitted including control bits, signaling bits and user bits). The TDD Mode is achieved by when receiver is used for down-linking user traffic from first hub BTS to leaf BTS and transmitter is used for up-linking user traffic from leaf BTS to Second hub BTS.

The control signals from the second hub BTS are periodically fed to the first hub BTS via X2 interface between the second hub BTS and first hub BTS. Also, the control signals from the leaf BTS are periodically fed to the first hub BTS via the second hub BTS and X2 interface between the second hub BTS and first hub BTS.

Figure 5:
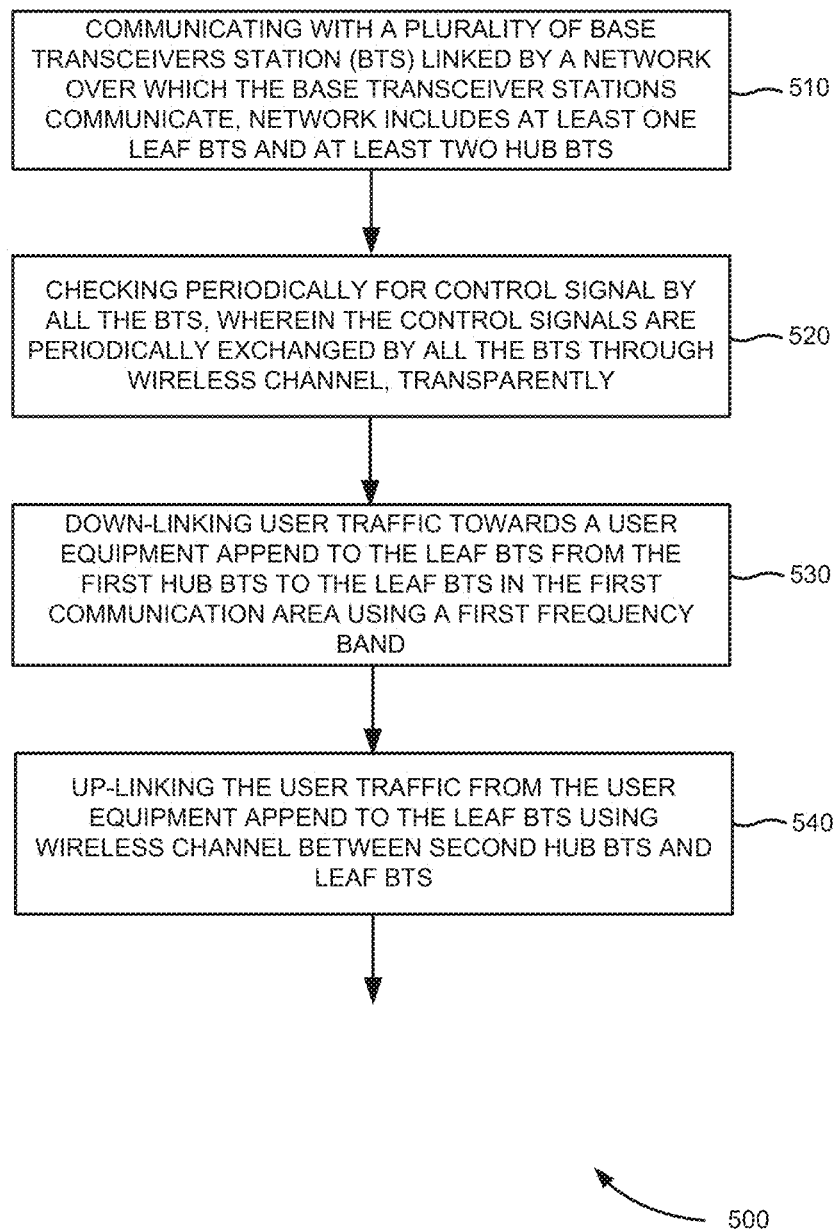
FIG. 5 shows a flow chart of an LTE wireless communication method for transceiving wireless device data according to one embodiment of the present invention.

FIG. 5 is a flowchart 500 illustrating operation of an LTE wireless communication method for transceiving wireless device data according to one embodiment of the present invention.

At step 510, the method communicates with one or more base transceiver station (BTS) linked by a network over which the base transceiver stations communicate, where the network includes at least one leaf BTS and at least two hub BTS. The hub BTS include but not limited to a first hub BTS and a second hub BTS.

At step 520, the method checks periodically for control signal by all the BTS. The control signals are periodically exchanged by all the BTS through wireless channel, transparently. The control signals from the second hub BTS are periodically fed to the first hub BTS and vice versa via X2 interface between the second hub BTS and first hub BTS. Further, the control signals from the leaf BTS are periodically fed to the first hub BTS via the second hub BTS via X2 interface between the second hub BTS and first hub BTS.

At step 530, the method downlinks user traffic towards a user equipment append to the leaf BTS from the first hub BTS to the leaf BTS in the first communication area using a first frequency band. The down-linking of the user traffic in the first communication area using a first frequency band through wireless channel from first hub BTS to leaf BTS.

At step 540, the method uplinks the user traffic from the user equipment append to the leaf BTS using wireless channel between second hub BTS and leaf BTS. The up-linking of the user traffic in the second communication area using a second frequency band through wireless channel from leaf BTS to second hub BTS, and then second hub BTS to first hub BTS via X2 interface.

In an operation uplink and downlink from the leaf BTS to first hub BTS and the second hub BTS by a non-congruent bearer path in an access communication network, and wherein the access communication network includes BTSs, UEs and wireless channel. Further, the uplink and downlink mechanism over the wireless channel is Time Division Duplex (TDD) Mode and the ratio of uplink and downlink user data rate is n:0 or 0:n. The n:0 configuration of TDD Mode i.e. 'n' provides that only one link at any point of time is used for up-linking and down-linking, where '0' signifies that another path is available free for other transmission (e.g. user data) Furthermore, the uplink and downlink mechanism over the wireless channel is Time Division Duplex (TDD) Mode and the ratio of uplink and downlink throughput data rate is n:0 or 0:n. 9 Here path '0' signifies that another path may be used for the throughput or total bits.

The leaf BTS is operated in a TDD Mode, where receiver is used for down-linking user traffic from first hub BTS to leaf BTS and transmitter is used for up-linking user traffic from leaf BTS to Second hub BTS. The present invention downlink traffic from multiple hub BTS can be received and leaf will send uplink to all those hub BTS over single wireless channel, i.e. to one hub BTS who will distribute to other BTS. The present method is useful as there is always difference in downlink rate and uplink rate.

Figure 6:
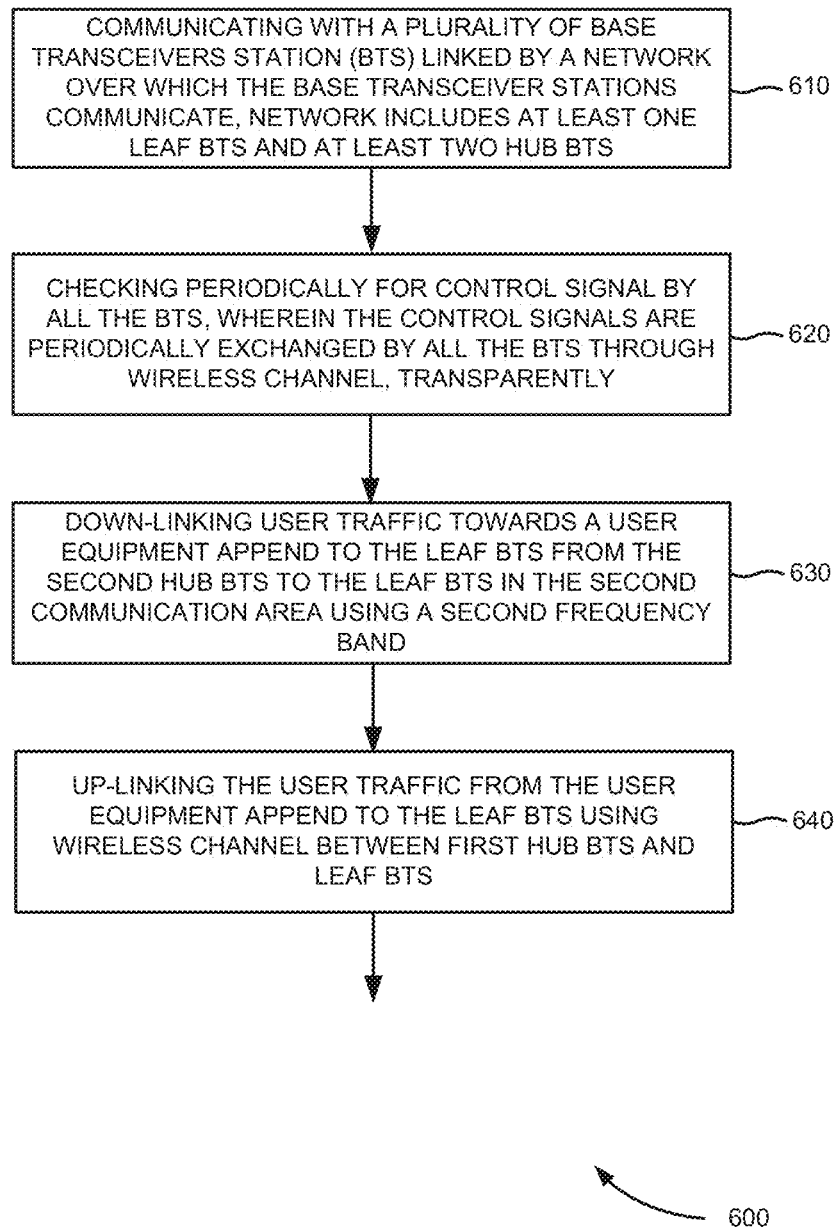
FIG. 6 shows a flow chart of an LTE wireless communication method for transceiving wireless device data according to another embodiment of the present invention.

FIG. 6 shows a flow chart 600 of an LTE wireless communication method for transceiving wireless device data according to another embodiment of the present invention.

At step 610, the method communicates with one or more base transceiver station (BTS) linked by a network over which the base transceiver stations communicate, where the network includes at least one leaf BTS and at least two hub BTS. The hub BTS include a first hub BTS and a second hub BTS At step 620, the method checks periodically for control signal by all the BTS, where the control signals are periodically exchanged by all the BTS through wireless channel, transparently. The control signals from the first hub BTS are periodically fed to the leaf BTS via the second hub BTS via X2 interface between the first hub BTS and second hub BTS.

At step 630, the method downlinks user traffic towards a user equipment append to the leaf BTS from the first hub BTS to the leaf BTS in the second communication area using a second frequency band. The down-linking of the user traffic in the second communication area using a second frequency band through wireless channel from second hub BTS to leaf BTS.

At step 640, the method uplinks the user traffic from the user equipment append to the leaf BTS using wireless channel between first hub BTS and leaf BTS. The up-linking of the user traffic in the first communication area is using a first frequency band through wireless channel from leaf BTS to first hub BTS.

In an example operation downlink and uplink from the leaf BTS to first hub BTS and the second hub BTS by a non-congruent bearer path in an access communication network. The access communication network includes BTSs, UEs and wireless channel. Further, the downlink and uplink mechanism over the wireless channel is Time Division Duplex (TDD) Mode and the ratio of uplink and downlink user data rate is n:0 or 0:n. Furthermore, the uplink and downlink mechanism over the wireless channel is Time Division Duplex (TDD) Mode and the ratio of uplink and downlink throughput data rate is n:0 or 0:n. The leaf BTS is operated in a TDD Mode, where receiver is used for down-linking user traffic from second hub BTS to leaf BTS and transmitter is used for up-linking user traffic from leaf BTS to first hub BTS.

Although the method flowchart includes steps 510-540 and 610-640 that are arranged logically in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 7:
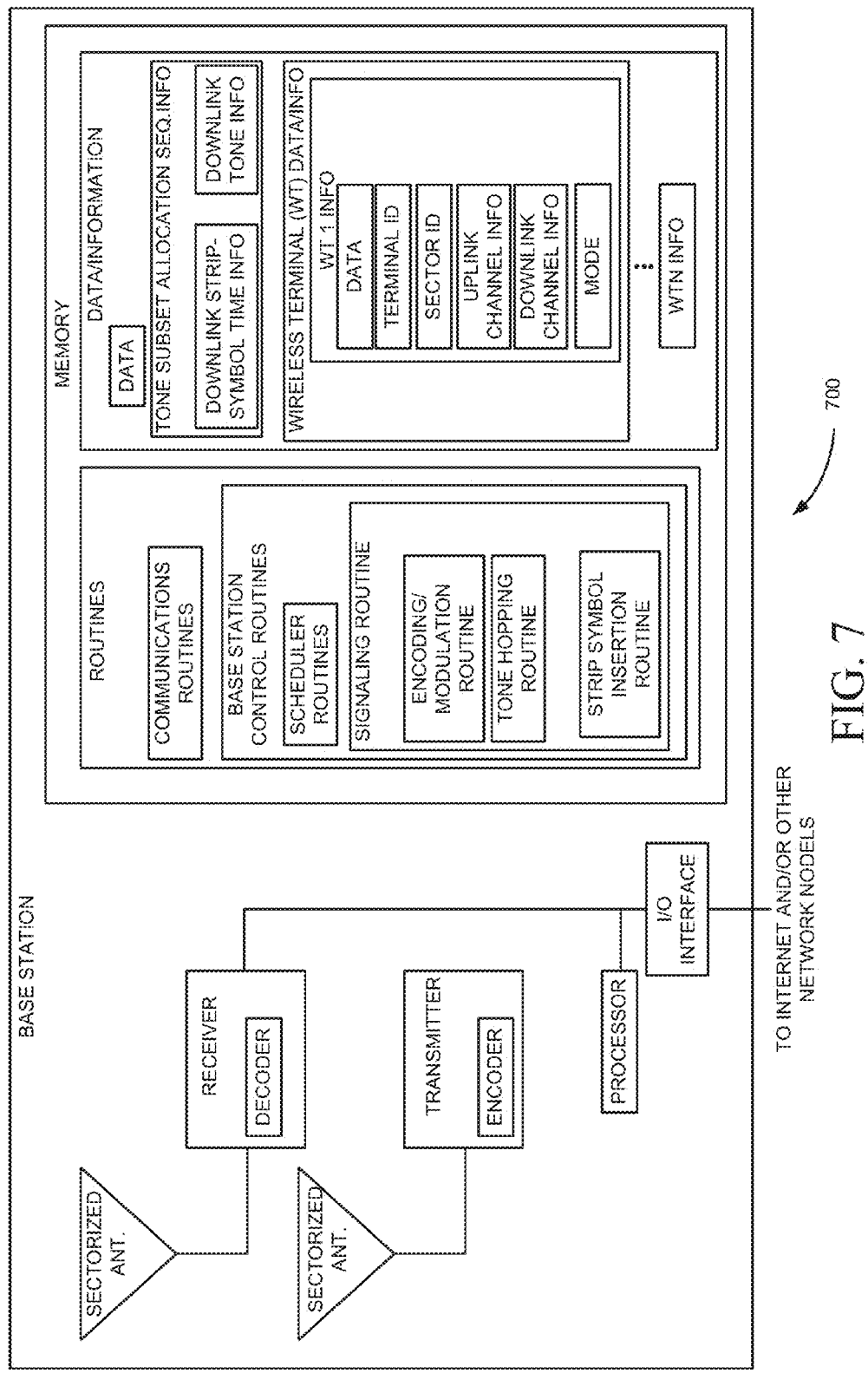
FIG. 7 is an illustration of an example base station in accordance with various aspects.

FIG. 7 illustrates an example base station 700 in accordance with various aspects. Base station implements tone subset allocation sequences, with different tone subset allocation sequences generated for respective different sector types of the cell. Base station may be used as any one of base stations of the system of FIG. 4. The base station includes a receiver, a transmitter, a processor, e.g., CPU, an input/output interface and memory coupled together by a bus over which various elements may interchange data and information.

Sectorized antenna coupled to receiver is used for receiving data and other signals, e.g., channel reports, from wireless terminals transmissions from each sector within the base station's cell. Sectorized antenna coupled to transmitter is used for transmitting data and other signals, e.g., control signals, pilot signal, beacon signals, etc. to wireless terminals or nodes (see FIG. 4) within each sector of the base station's cell. In various aspects, base station may employ multiple receivers and multiple transmitters, e.g., an individual receiver for each sector and an individual transmitter for each sector. Processor, may be, e.g., a general purpose central processing unit (CPU). Processor controls operation of base station under direction of one or more routines stored in memory and implements the methods. I/O interface provides a connection to other network nodes, coupling the BS to other base stations, access routers, AAA server nodes, etc., other networks, and the Internet. Memory includes routines and data/information.

Data/information includes data, tone subset allocation sequence information including downlink strip-symbol time information and downlink tone information, and wireless terminal (WT) data/info including a plurality of sets of WT information: WT 1 info and WT N info. Each set of WT info, e.g., WT 1 info includes data, terminal ID, sector ID, uplink channel information, downlink channel information, and mode information.

Routines include communications routines and base station control routines. Base station control routines includes a scheduler routine and signaling routines including an encoding/modulation routine, a tone hopping routine, and a strip symbol insertion routine. Scheduler routine controls determining a type of downlink transmission unit to transmit (e.g., type 0, type 1, . . . ).

Data includes data to be transmitted that will be sent to encoder of transmitter for encoding prior to transmission to WTs, and received data from WTs that has been processed through decoder of receiver following reception. Downlink strip-symbol time information includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information includes information including a carrier frequency assigned to the base station, the number and frequency of tones, and the set of tone subsets to be allocated to the strip-symbol periods, and other cell and sector specific values such as slope, slope index and sector type.

Data may include data that WT 1 has received from a peer node, data that WT 1 desires to be transmitted to a peer node, and downlink channel quality report feedback information. Terminal ID is a base station assigned ID that identifies WT 1. Sector ID includes information identifying the sector in which WT 1 is operating. Sector ID can be used, for example, to determine the sector type. Uplink channel information includes information identifying channel segments that have been allocated by scheduler for WT 1 to use, e.g., uplink traffic channel segments for data, dedicated uplink control channels for requests, power control, timing control, etc. Each uplink channel assigned to WT 1 includes one or more logical tones, each logical tone following an uplink hopping sequence. Downlink channel information includes information identifying channel segments that have been allocated by scheduler to carry data and/or information to WT 1, e.g., downlink traffic channel segments for user data. Each downlink channel assigned to WT 1 includes one or more logical tones, each following a downlink hopping sequence. Mode information includes information identifying the state of operation of WT 1, e.g. sleep, hold, on.

Communications routines control the base station to perform various communications operations and implement various communications protocols. Base station control routines are used to control the base station to perform basic base station functional tasks, e.g., signal generation and reception, scheduling, and to implement the steps of the method of some aspects including transmitting signals to wireless terminals using the tone subset allocation sequences during the strip-symbol periods.

Signaling routine controls the operation of receiver with its decoder and transmitter with its encoder. The signaling routine is responsible for controlling the generation of transmitted data and control information. Encoding/modulation routine controls coding and modulation for non-strip symbols and strip symbols. Further, tone hopping routine controls tone hopping in connection with non-strip symbols. Moreover, strip symbol insertion routine controls selectively positioning a strip symbol within a type 1 downlink transmission unit.

Expressions such as "including", "comprising", "incorporating", "consisting of, "have", "is" used to describe and claim the present invention are intended to be construed in a nonexclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

FIGS. 1-7 are merely representational and are not drawn to scale. Certain portions thereof may be exaggerated, while others may be minimized. FIGS. 1-7 illustrate various embodiments of the invention that can be understood and appropriately carried out by those of ordinary skill in the art.

I claim:

1. An LTE wireless communication method for transceiving wireless device data, the method comprising:
a plurality of base transceiver station (BTS) linked by a network over which the base transceiver stations communicate, wherein the network includes at least one leaf BTS and at least two hub BTS, and wherein hub BTS include a first hub BTS and a second hub BTS;

checking periodically for control signals by all the BTS, wherein the control signals are periodically exchanged by all the BTS through wireless channel, transparently;

down-linking user traffic towards a user equipment appended to the leaf BTS, from the first hub BTS to the leaf BTS, in the first communication area using a first frequency band; and up-linking the user traffic from the user equipment appended to the leaf BTS using wireless channel between second hub BTS and leaf BTS.

2. The method of claim 1, wherein the step of uplink and downlink from the leaf BTS to first hub BTS and the second hub BTS by a non-congruent bearer path in an access communication network, and wherein the access communication network includes BTSs, UEs and wireless channels.

3. The method of claim 1, wherein the uplink and downlink mechanism over the wireless channel is Time Division Duplex (TDD) Mode and the ratio of uplink and downlink user data rate is n:0 or 0:n.

4. The method of claim 1, wherein the uplink and downlink mechanism over the wireless channel is Time Division Duplex (TDD) Mode and the ratio of uplink and downlink throughput data rate is n:0 or 0:n.

5. The method of claim 1, wherein the control signals from the first hub BTS are periodically fed to the second hub BTS and vice versa via X2 interface between the first hub BTS and second hub BTS.

6. The method of claim 5, wherein the control signals from the leaf BTS are periodically fed to the first hub BTS via the second hub BTS via X2 interface between the second hub BTS and first hub BTS.

7. The method of claim 1, wherein step of down-linking the user traffic in the first communication area using a first frequency band through wireless channel from first hub BTS to leaf BTS.

8. The method of claim 1, wherein step of up-linking the user traffic in a second communication area comprises using a second frequency band of a wireless channel from leaf BTS to second hub BTS, and then second BTS to first hub BTS via X2 interface.

9. The method of claim 1, wherein the leaf BTS is operated in a TDD Mode, where receiver is used for down-linking user traffic from first hub BTS to leaf BTS and transmitter is used for up-linking user traffic from leaf BTS to second hub BTS.

10. An LTE wireless communication method for transceiving wireless device data, the method comprising:

a plurality of base transceiver stations (BTS) linked by a network over which the base transceiver stations communicate, wherein the network includes at least one leaf BTS and at least two hub BTS, and wherein hub BTS include a first hub BTS and a second hub BTS;

checking periodically for control signals by all the BTS, wherein the control signals are periodically exchanged by all the BTS through wireless channel, transparently;

down-linking user traffic towards a user equipment appended to the leaf BTS, from the second hub BTS to the leaf BTS, in the second communication area using a second frequency band; and up-linking the user traffic from the user equipment appended to the leaf BTS using wireless channel between first hub BTS and leaf BTS.

11. The method of claim 10, wherein the step of downlink and uplink from the leaf BTS to first hub BTS and the second hub BTS by a non-congruent bearer path in an access communication network, and wherein the access communication network includes BTSs, UEs and wireless channels.

12. The method of claim 10, wherein the downlink and uplink mechanism over the wireless channel is Time Division Duplex (TDD) Mode and the ratio of uplink and downlink user data rate is n:0 or 0:n.

13. The method of claim 10, wherein the uplink and downlink mechanism over the wireless channel is Time Division Duplex (TDD) Mode and the ratio of uplink and downlink throughput data rate is n:0 or 0:n.

14. The method of claim 10, wherein the control signals from the first hub BTS are periodically fed to the leaf BTS via the second hub BTS via X2 interface between the first hub BTS and second hub BTS.

15. The method of claim 10, wherein step of down-linking the user traffic in the second communication area using a second frequency band through wireless channel from second hub BTS to leaf BTS.

16. The method of claim 10, wherein step of up-linking the user traffic in a first communication area comprises using a first frequency band of a wireless channel from leaf BTS to first hub BTS.

17. The method of claim 10, wherein the leaf BTS is operated in a TDD Mode, where receiver is used for down-linking user traffic from second hub BTS to leaf BTS and transmitter is used for up-linking user traffic from leaf BTS to first hub BTS.

18. An eNodeB or a relay node or a BTS, comprising:
a memory;
a processor communicatively coupled to the memory; and
a control circuit communicatively coupled to the memory and the processor, wherein the control circuit is configured for transceiving wireless device data to perform:
communicating with a plurality of base transceivers stations (BTS) linked by a network over which the base transceiver stations communicate, wherein the network includes at least one leaf BTS and at least two hub BTS, and wherein hub BTS include a first hub BTS and a second hub BTS;
checking periodically for control signals by all the BTS, wherein the control signals are periodically exchanged by all the BTS through wireless channel, transparently;
down-linking user traffic towards a user equipment appended to the leaf BTS, from the first hub BTS to the leaf BTS, in the first communication area using a first frequency band; and
up-linking the user traffic from the user equipment appended to the leaf BTS using wireless channel between second hub BTS and leaf BTS.

19. An eNodeB or a relay node or a BTS, comprising:
a memory;
a processor communicatively coupled to the memory; and
a control circuit communicatively coupled to the memory and the processor, wherein the control circuit is configured for transceiving wireless device data to perform:
communicating with a plurality of base transceiver stations (BTS) linked by a network over which the base transceiver stations communicate, wherein the network includes at least one leaf BTS and at least two hub BTS, and wherein hub BTS include a first hub BTS and a second hub BTS;
checking periodically for control signals by all the BTS, wherein the control signals are periodically exchanged by all the BTS through wireless channel, transparently;

down-linking user traffic towards a user equipment appended to the leaf BTS, from the second hub BTS to the leaf BTS, in the second communication area using a second frequency band; and up-linking the user traffic from the user equipment appended to the leaf BTS using wireless channel between first hub BTS and leaf BTS.

* * * * *